United States Patent Office 2,782,098
Patented Feb. 19, 1957

2,782,098

METHOD OF MAKING MANGANESE DIOXIDE DEPOLARIZER

Lloyd Berg, Bozeman, Mont., Jack A. Davidson and Robert L. Nickelson, Minneapolis, Minn., and William F. Nye, Fair Haven, N. J., assignors to the United States of America as represented by the Secretary of the Army No Drawing. Application April 29, 1954,
Serial No. 426,614

1 Claim. (Cl. 23—145)

This invention relates to a method of making a specific type of manganese dioxide particularly suitable as depolarizer for Le Clanche type dry cells.

It is well known that wide differences exist in the dry cell utility of various forms of manganese dioxides. From X-ray diffraction and electron microscope patterns it was found that manganese dioxide exists in two basic polymorphs. Based on their diffraction patterns, modifications of these two polymorphs have been divided into seven phase types known as alpha, beta, gamma, delta, epsilon, rho and Ramsdellite.

Battery drain test data have shown that the gamma type of manganese dioxide depolarizer is superior to the others as indicated by battery life. Due to a scarcity of gamma type manganese dioxide among the known domestic ores, investigations were conducted to find a process for converting the inactive (non-gamma) ores to the gamma phase type.

Several methods have also been reported for producing synthetic manganese dioxide depolarizers. These include oxidation of lower oxides of manganese ($Mn_2O_3$, $Mn_3O_4$ etc.) with mineral acids and chlorine oxidation of manganous salts with sodium hypochlorite, electrolytic oxidation of manganous sulfate solutions, thermal reduction of manganous nitrate solutions, and the thermal reduction of manganous carbonate.

The present invention is based on the discovery that a particular active modification of a gamma type of manganese dioxide depolarizer will be obtained if a permanganic acid solution is sprayed on a hard surface at temperatures at which the permanganic acid decomposes and under conditions which force such thermal decomposition to occur at the moment when the solution disintegrates into droplets with free access of air to each droplet. Such conditions are attained by spraying aqueous solutions of permanganic acid at temperatures ranging from about 25° C. to 200° C. on a flat, hard surface of a material which will not be corroded by the reactants at the temperatures used and which will prevent harmful metallic contamination. The use of granite has been found especially advantageous but other materials such as porcelainized metal, metal bonded with ceramics or glazed ceramics may also be used as well as any other earth that would not corrode under the prevailing conditions and not contaminate the end product.

In spraying an aqueous solution of permanganic acid on a slab under the above described conditions a hard layer of manganese dioxide is formed on the surface of the slab. This layer is removed by scraping and then ground to the fineness desired for depolarizing material as used in Le Clanche type dry cells.

The nature of this invention and its objects and advantages will be more clearly understood from the description of the following specific embodiments:

*Example 1.*—A permanganic acid solution was prepared by dissolving one pound of barium permanganate in 1270 ml. of water and adding 67 ml. of concentrated sulfuric acid. After the barium sulfate was filtered off, the resulting permanganic acid solution was sprayed on a granite slab which was maintained at 150–200° C. The layer of manganese dioxide formed was removed by scraping, ground and tested. The following test data were obtained:

| | |
|---|---|
| High drain battery test_____hr__ | 4.5 |
| Low drain battery test_____hr__ | 131.5 |
| Available $O_2$ as percent $MnO_2$_____percent__ | 83.3 |
| Total Mn_____do____ | 51.9 |
| Moisture _____do____ | 2.48 |
| Density _____g./in.$^3$__ | 27.1 |
| Micro-optical analysis_____ | (1) |
| pH _____ | 6.6 |

[1] Poorly crystallized beta or gamma. Similar to gamma electrolytic manganese dioxide.

*Example 2.*—A permanganic acid solution was prepared by dissolving 216 grams of barium permanganate in 600 ml. of water and adding 32 ml. of concentrated sulfuric acid. After the barium sulfate was filtered off, the resulting permanganic solution was decomposed at room temperature (25° C.) by spraying on a granite slab and then treated as described in Example 1. The following test data were obtained:

| | |
|---|---|
| High drain battery test_____hr__ | 1.8 |
| Low drain battery test_____hr__ | 88.0 |
| Available $O_2$ as percent $MnO_2$_____percent__ | 81.7 |
| Total Mn_____do____ | 58.3 |
| Moisture _____do____ | 1.12 |
| Density _____g./in.$^3$__ | 13.0 |
| Micro-optical analysis_____ | (1) |
| pH _____ | 5.4 |

[1] Very poorly crystallized gamma.

Reduction of the solution of permanganic acid at the low temperature range was found to produce a manganese dioxide which gave poorer battery performance than that obtained by reduction at higher temperatures. The optimum concentration of permanganic acid was found to be slightly below 20 percent. Greater concentrations have been reported to be explosive in nature while extremely dilute solutions are undesirable due to the increased heat consumption required for the evaporation of the excess water.

Any permanganic acid may be used for the purpose of the present invention whether synthesized by the above described or by any other process or combination of processes.

The synthetic manganese dioxide depolarizer produced by the thermal decomposition of permanganic acid according to the present invention is superior to any known domestic and foreign natural ores as measured by conventional battery performance tests.

The invention is not limited to the above described embodiments and various modifications are conceivable within the scope of the inventive idea as defined in the appended claim.

What is claimed is:

A method of synthesizing a gamma-type manganese dioxide depolarizer for Le Clanche type dry cells comprising spraying an aqueous solution of permanganic acid against a hard surface of a granite slab maintained at temperatures between 150 to 200° C.; removing the layer of manganese dioxide formed by thermal decomposition on the surface of said slab; and grinding the solid gamma-type manganese dioxide thus formed to the desired fineness.

References Cited in the file of this patent

UNITED STATES PATENTS

| | | |
|---|---|---|
| 1,351,859 | Lowe et al. | Sept. 7, 1920 |
| 1,544,115 | Wilson et al. | June 30, 1925 |
| 2,609,337 | Taylor et al. | Sept. 2, 1952 |

OTHER REFERENCES

Mellor: "Comprehensive Treatise on Inorganic and Theoretical Chemistry," published by Longmans, Green and Co., New York, 1932, vol. 12, page 297.

Thorpe: "Dictionary of Applied Chemistry," published by Longmans, Green and Co., New York, 1946, vol. 7, page 492.